US008407789B1

(12) United States Patent
Mears

(10) Patent No.: US 8,407,789 B1
(45) Date of Patent: Mar. 26, 2013

(54) METHOD AND SYSTEM FOR DYNAMICALLY OPTIMIZING MULTIPLE FILTER/STAGE SECURITY SYSTEMS

(75) Inventor: John Mears, Oxfordshire (GB)

(73) Assignee: Symantec Corporation, Mountain View, CA (US)

( * ) Notice: Subject to any disclaimer, the term of this patent is extended or adjusted under 35 U.S.C. 154(b) by 576 days.

(21) Appl. No.: 12/618,948

(22) Filed: Nov. 16, 2009

(51) Int. Cl.
H04L 29/06 (2006.01)
(52) U.S. Cl. .................... 726/22; 726/1; 726/13
(58) Field of Classification Search ............... 726/22, 726/1, 13
See application file for complete search history.

(56) References Cited

U.S. PATENT DOCUMENTS

| | | | |
|---|---|---|---|
| 6,356,941 B1 * | 3/2002 | Cohen | 709/219 |
| 6,606,710 B2 * | 8/2003 | Krishnan et al. | 726/13 |
| 6,983,323 B2 * | 1/2006 | Cantrell et al. | 709/225 |
| 7,047,297 B2 * | 5/2006 | Huntington et al. | 709/224 |
| 7,149,189 B2 * | 12/2006 | Huntington et al. | 370/235 |
| 7,162,698 B2 * | 1/2007 | Huntington et al. | 715/736 |
| 7,315,894 B2 * | 1/2008 | Huntington et al. | 709/224 |
| 7,441,022 B1 | 10/2008 | Schuba et al. | 709/223 |
| 7,472,422 B1 * | 12/2008 | Agbabian | 726/25 |
| 7,546,379 B2 * | 6/2009 | Bess et al. | 709/240 |
| 7,610,330 B1 * | 10/2009 | Quinn et al. | 709/201 |
| 7,673,242 B1 * | 3/2010 | Huntington et al. | 715/736 |
| 7,742,406 B1 * | 6/2010 | Muppala | 370/230 |
| 7,760,730 B2 * | 7/2010 | Goldschmidt et al. | 370/392 |
| 7,769,860 B1 * | 8/2010 | Assadzadeh | 709/225 |
| 7,792,775 B2 * | 9/2010 | Matsuda | 706/47 |
| 7,870,231 B2 * | 1/2011 | Mudireddy et al. | 709/220 |
| 8,018,943 B1 * | 9/2011 | Pleshek et al. | 370/392 |
| 8,032,653 B1 * | 10/2011 | Liu et al. | 709/235 |
| 8,042,167 B2 * | 10/2011 | Fulp et al. | 726/11 |
| 8,098,677 B1 * | 1/2012 | Pleshek et al. | 370/419 |
| 2002/0143914 A1 * | 10/2002 | Cihula | 709/223 |
| 2003/0051165 A1 * | 3/2003 | Krishnan et al. | 713/201 |
| 2003/0135612 A1 * | 7/2003 | Huntington et al. | 709/224 |
| 2004/0030776 A1 * | 2/2004 | Cantrell et al. | 709/224 |
| 2004/0177139 A1 * | 9/2004 | Schuba et al. | 709/223 |
| 2005/0276262 A1 * | 12/2005 | Schuba et al. | 370/389 |
| 2005/0278431 A1 * | 12/2005 | Goldschmidt et al. | 709/207 |

(Continued)

OTHER PUBLICATIONS

Hohpe et al., "Introduction to Message Routing", *Enterprise Integration Patterns*, 2003, pp. 1-3 [online]. Retrieved on Dec. 11, 2009 from the Internet: <URL:http://www.enterpriseintegrationpatterns.com/MessageRoutingIntro.html>.

(Continued)

*Primary Examiner* — David Garcia Cervetti
(74) *Attorney, Agent, or Firm* — McKay and Hodgson, LLP; Serge J. Hodgson; Sean P. Lewis

(57) ABSTRACT

A method and apparatus for dynamically and automatically optimizing multiple filter/stage security systems whereby a multiple filter/stage security system is provided that includes two or more filters or "stages" and is initially implemented such that the two or more filters/stages are used in an initial order, i.e., in a defined initial sequence. At least two of the two or more filters/stages are then monitored to determine the composite "cost" and/or effectiveness of each filter/stage. Data representing the results of the monitoring of the at least two of the two or more filters/stages is then analyzed to determine a cost/use profile for each filter/stage and the cost/use profile for each filter/stage is then analyzed to determine an optimal order of the at least two of the two or more filters/stages, i.e., an optimal filter/stage sequence, based on actual filter/stage use, actual composite filter/stage cost, and/or user and/or system defined priorities. The optimal filter/stage sequence is then implemented.

20 Claims, 4 Drawing Sheets

U.S. PATENT DOCUMENTS

| | | | |
|---|---|---|---|
| 2006/0013136 A1* | 1/2006 | Goldschmidt et al. | 370/235 |
| 2006/0248580 A1* | 11/2006 | Fulp et al. | 726/11 |
| 2007/0271616 A1* | 11/2007 | Jung et al. | 726/24 |
| 2008/0034052 A1* | 2/2008 | Bess et al. | 709/207 |
| 2008/0107068 A1* | 5/2008 | Kitahama et al. | 370/328 |
| 2008/0109869 A1* | 5/2008 | Kulkarni et al. | 726/1 |
| 2008/0140991 A1* | 6/2008 | Pandya | 712/37 |
| 2008/0215518 A1* | 9/2008 | Matsuda | 706/47 |
| 2009/0049230 A1* | 2/2009 | Pandya | 711/101 |
| 2009/0328219 A1* | 12/2009 | Narayanaswamy | 726/23 |
| 2010/0251370 A1* | 9/2010 | Sun et al. | 726/23 |

OTHER PUBLICATIONS

"Proofpoint Dynamic Reputation and netMLX", 2007, Proofpoint, Inc., Sunnyvale, CA, pp. 1-2 [online]. Retrieved on Dec. 11, 2009 from the Internet: <URL:http://www.proofpoint.com/products/dynamic-reputation.php>. No author provided.

* cited by examiner

METHOD AND SYSTEM FOR DYNAMICALLY OPTIMIZING MULTIPLE FILTER/STAGE SECURITY SYSTEMS

BACKGROUND OF THE INVENTION

One major issue facing modern communications systems, such as the Internet, is the prevalence and propagation of spam and/or scam electronic mail (e-mail), e-mail and/or files that include malicious content, and various other forms of malware that is propagated via e-mail, instant messages (IMs), or any other forms of file transfer from computing system to computing system and/or from web-pages/web-based function to computing systems.

Herein, malicious content includes, but is not limited to: any content that promotes and/or is associated with fraud; any content that promotes and/or is associated with various financial scams; any content that promotes and/or is associated with any criminal activity; and/or any content that promotes and/or is associated with harmful and/or otherwise undesirable content, whether illegal in a given jurisdiction or not.

Herein, spam includes any messages, such as, but not limited to e-mail or instant messages, that are not desired by the intended receiver of the message.

Herein, malware includes, but is not limited to, any software and/or code designed to infiltrate a user's computing system without the user's informed and/or explicit consent. Some of the better known forms of malware include computer viruses and spyware.

Herein, spam, scam e-mails, malicious content containing messages and/or files, and malware, and/or any data and/or files obtained from and/or through one or more computing systems, and/or one or more websites, web-pages, and/or web-based functions, and/or from any other source, are collectively referred to as "undesirable content" and/or "e-mails", "IMs", and/or "files" containing undesirable content.

In order to combat the seemingly ever increasing volume of undesirable content, numerous security systems are currently available that include two or more filters, or "stages", with each filter/stage being implemented to block, or filter out, a specific type of undesirable content. Typically, using these multiple filter/stage security systems, a given e-mail, IM, or file is subjected to each filter/stage in a defined sequence. However, each filter/stage of a multiple filter/stage security system has an associated filter/stage cost. This filter/stage cost is typically made up of, but is not limited to, one or more of the following filter/stage cost components: the cost of capital equipment necessary to implement the given filter/stage, e.g., the cost of the servers, routers, and other hardware necessary to implement the given filter/stage; the hosting costs associated with the given filter/stage, such as data center costs associated with the given filter/stage; the processing costs associated with the given filter/stage, e.g., the processor time and/or cycles associated with implementing the given filter/stage; database access and access time associated with implementing the given filter/stage; disk access time associated with implementing the given filter/stage; Input/Output (I/O) latencies associated with implementing the given filter/stage; and/or various other costs associated with implementing each filter/stage.

As a result of the costs associated with implementing each filter/stage of a multiple filter/stage security system, once a given e-mail, IM, or file is blocked/filtered by a given filter/stage, the given e-mail, IM, or file is typically taken out of the filtering sequence of the multiple filter/stage security system to avoid wasting further filtering resources on a determined problematic e-mail, IM, or file.

Currently, the order in which each filter/stage of a multiple filter/stage security system is applied, i.e., the sequence of the filters/stages of a multiple filter/stage security system a given e-mail, IM, or file is subjected to, is typically statically defined, often based on the known environment at the time the multiple filter/stage security system is initially implemented. Then, once the multiple filter/stage security system is implemented, the sequence in which each filter/stage of a multiple filter/stage security system is applied remains the same unless the order in which each filter/stage of a multiple filter/stage security system is applied is manually changed/updated.

Given the highly dynamic nature, volume, and variety of undesirable content currently being propagated, this static nature of currently available multiple filter/stage security systems often results in significant amounts of resources being inefficiently, and often ineffectively, allocated. For instance, as particular types of threats, such as viruses, surface, and/or the nature of the most significant threat changes, such as a shift from virus threats to spam-based issues, a static multiple filter/stage security system may waste significant amounts of time and other resources performing virus checks on e-mails that will eventually be deemed to be spam at a later filter/stage, and therefore will be discarded anyway.

In addition, the nature and priority of the filtering desired/necessary can be different, and change at different rates, based on the individual user of the multiple filter/stage security system and the type of undesirable content that specific user must deal with.

As a simple example, a given user may initially purchase and implement a multiple filter/stage security system for the purpose of virus detection/blocking, and perhaps a specific type of malware, such as a Trojan, that is prevalent at the time of purchase. However, as a new company, with a relatively unknown e-mail address, the user may be less concerned with spam. As a result, the initial set up of a multiple filter/stage security system for the user may include a sequence whereby a given e-mail, IM, or file is first subjected to a virus detection/blocking filter/stage and then a spam detection/blocking filter/stage. It may further be the case that the cost of the virus detection/blocking filter/stage, in terms of the one or more filter/stage cost components discussed above, is relatively high while the cost of spam detection/blocking filter/stage is relatively low. However, given the user's emphasis on virus protection desired at the time of implementation of the multiple filter/stage security system, the initial sequence may be desirable. However, over time, and in some cases a relatively short period of time, it is quite possible that spam will become a far bigger issue for the user than viruses and/or it may be that many viruses are now being transmitted via spam. As a result of this change in circumstances, and the nature of the treat to this user, it might be highly advantageous to change the sequence of the multiple filter/stage security system so that the relatively low cost spam detection/blocking filter/stage is implemented before the relatively high cost virus detection/blocking filter/stage. This is particularly true given that, in this specific example, many viruses, i.e., those included in spam, would be blocked by application of the spam detection/blocking filter/stage before resources were used to analyze and perform virus detection/blocking. However, using currently available multiple filter/stage security systems, the initial sequence is basically static until manually changed and it is highly unlikely, using currently available multiple filter/stage security systems, that the user would ever even become aware of the change in circumstances and/or nature of the threat. Consequently, using currently available multiple filter/ stage security systems, the user would continue to perform the costly, and now largely unnecessary, virus detection/blocking filter/stage on e-mails, IMs, and/or files that will eventually be blocked at the relatively "cheap" spam detection/blocking filter/stage anyway.

As another simple example, spam, or other undesired content, may change its nature over time from primarily text-based to primarily image-based. As a result, an initial set up of a multiple filter/stage security system may include a text-based detection/blocking filter/stage that is initially effective at the time of installation, and is relatively low "cost". However, as the nature of the spam or other undesired content, changes from primarily text-based to primarily image-based, the text-based detection/blocking filter/stage may prove less effective than an image-based detection/blocking filter/stage, despite a higher "cost" of the image-based detection/blocking filter/stage. In this instance, it might be in the user's best interest to implement the image-based detection/blocking filter/stage before, or as a replacement for, the text-based detection/blocking filter/stage, despite the higher "cost" of the image-based detection/blocking filter/stage. However, once again using currently available multiple filter/stage security systems, the initial sequence is basically static until manually changed and it is highly likely, using currently available multiple filter/stage security systems, that the user would never even become aware of the change in circumstances and/or nature of the threat.

As a result of the situation described above, and the largely static nature of currently available multiple filter/stage security systems, many users of currently available multiple filter/stage security systems inefficiently, and often ineffectively, allocate their security system resources. As result, time and money are currently often wasted on: capital equipment necessary to implement the unnecessary application of one or more filter/stages; hosting unnecessary applications of one or more filter/stages; processing associated with the unnecessary application of one or more filter/stages; database access and access time associated with the unnecessary application of one or more filter/stages; disk access time associated with the unnecessary application of one or more filter/stages; Input/Output (I/O) latencies associated with the unnecessary application of one or more filter/stages; and/or various other costs associated with the unnecessary application of one or more filter/stages. This situation is undesirable for both the user and the providers of multiple filter/stage security systems.

SUMMARY

According to one embodiment of a method and apparatus for dynamically and automatically optimizing multiple filter/stage security systems, a given multiple filter/stage security system is provided that includes two or more filters or "stages". In one embodiment, the given multiple filter/stage security system is initially implemented such that the two or more filters/stages are used in an initial order such that a given e-mail, IM, or file is subjected to each filter/stage in a defined initial sequence. In one embodiment, at least two of the two or more filters/stages are monitored to determine the composite "cost" and/or effectiveness of each filter/stage. In one embodiment, data representing the results of the monitoring of the at least two of the two or more filters/stages is analyzed to determine a cost/use profile for each filter/stage. In one embodiment, the cost/use profile for each filter/stage is then analyzed to determine an optimal order of the at least two of the two or more filters/stages, i.e., an optimal filter/stage sequence, based on actual filter/stage use, actual composite filter/stage cost, and/or user and/or system defined priorities. In one embodiment, the optimal filter/stage sequence is then implemented. In one embodiment, the at least two of the two or more filters/stages are periodically, and/or continuously, monitored, the analysis to determine a cost/use profile for each filter/stage is repeated periodically, the optimal filter/stage sequence is updated periodically, and a new/updated optimal filter/stage sequence is implemented/re-implemented periodically.

In one embodiment, the given multiple filter/stage security system provided includes two or more filters or "stages" with each filter/stage being implemented to detect, block, or filter out, a specific type of undesirable content and/or detect, block, or filter out, undesirable content based on specific parameters/tests.

In one embodiment, the given multiple filter/stage security system is implemented, at least in part, locally on a user computing system.

In one embodiment, the given multiple filter/stage security system is implemented, at least in part, remotely on a security system provider computing system, and/or any computing system otherwise associated with the security system provider.

In one embodiment, the given multiple filter/stage security system is initially implemented such that the two or more filters/stages are used in a defined initial sequence based on theoretical estimates of the cost associated with each the two or more filters/stages and/or based on a perceived threat and/or based on user priorities.

In one embodiment, at least two of the two or more filters/stages are monitored to determine the cost of each filter/stage and/or the effectiveness of each filter/stage by monitoring one or more of the following cost/use parameters: the cost of capital equipment necessary to implement the given filter/stage, e.g., the cost of the servers, routers, and other hardware necessary to implement the given filter/stage; the hosting costs associated with the given filter/stage, such as data center costs associated with the given filter/stage; the processing costs associated with the given filter/stage, e.g., the processor time and/or cycles associated with implementing the given filter/stage; database access and lookups and access time associated with implementing the given filter/stage; disk access time associated with implementing the given filter/stage; Input/Output (I/O) latencies associated with implementing the given filter/stage; the actual number and/or proportion of e-mails, IMs, and/or files blocked by the given filter/stage; the actual or "real" positive results obtained, i.e., the number/proportion of e-mails, IMs, and/or files blocked by the given filter/stage that actually included, or were, undesirable content; the number of "false" positive results obtained, i.e., the number/proportion of e-mails, IMs, and/or files blocked by the given filter/stage that did not include undesirable content; and/or any other costs associated with implementing each filter/stage desired by the provider of the method and apparatus for dynamically and automatically optimizing multiple filter/stage security systems and/or one or more users of the method and apparatus for dynamically and automatically optimizing multiple filter/stage security systems.

In one embodiment, the at least two of the two or more filters/stages are monitored to determine the cost of each filter/stage and/or the effectiveness of each filter/stage, at least in part, locally on a user computing system.

In one embodiment, the at least two of the two or more filters/stages are monitored to determine the cost of each filter/stage and/or the effectiveness of each filter/stage, at least in part, remotely on a security system provider computing system, and/or a computing system otherwise associated with the security system provider.

In one embodiment, the at least two of the two or more filters/stages are monitored to determine the cost of each filter/stage and/or the effectiveness of each filter/stage, at least in part, by a third party.

In one embodiment, data representing the results of the monitoring of the at least two of the two or more filters/stages is analyzed using one or more processors associated with one or more computing systems to determine a cost/use profile for each filter/stage.

In one embodiment, the cost/use profile for each filter/stage includes data representing, but not limited to, one or more of the following cost/use profile parameters: the cost of capital equipment necessary to implement the given filter/stage, e.g., the cost of the servers, routers, and other hardware necessary to implement the given filter/stage; the hosting costs associated with the given filter/stage, such as data center costs associated with the given filter/stage; the processing costs associated with the given filter/stage, e.g., the processor time and/or cycles associated with implementing the given filter/stage; database access and lookups and access time associated with implementing the given filter/stage; disk access time associated with implementing the given filter/stage; Input/Output (I/O) latencies associated with implementing the given filter/stage; the actual number and/or proportion of e-mails, IMs, and/or files blocked by the given filter/stage; the actual or "real" positive results obtained, i.e., the number/proportion of e-mails, IMs, and/or files blocked by the given filter/stage that actually included, or were, undesirable content; the number of "false" positive results obtained, i.e., the number/proportion of e-mails, IMs, and/or files blocked by the given filter/stage that did not include undesirable content; and/or any other costs associated with implementing each filter/stage desired by the provider of the method and apparatus for dynamically and automatically optimizing multiple filter/stage security systems and/or one or more users of the method and apparatus for dynamically and automatically optimizing multiple filter/stage security systems.

In one embodiment, the cost/use profile parameters are prioritized by the provider of the method and apparatus for dynamically and automatically optimizing multiple filter/stage security systems, and/or one or more users of the method and apparatus for dynamically and automatically optimizing multiple filter/stage security systems.

In one embodiment, the cost/use profile for each filter/stage is then analyzed to determine an optimal order of the at least two of the two or more filters/stages, i.e., an optimal filter/stage sequence. In one embodiment, the optimal order of the at least two of the two or more filters/stages is determined based on the cost/use profile for each filter/stage and the prioritized cost/use profile parameters for each filter/stage.

In one embodiment, the optimal filter/stage sequence is then provided to the filter supervisor and the optimal filter/stage sequence is then implemented automatically.

In one embodiment, the optimal filter/stage sequence is then provided to the filter supervisor and the optimal filter/stage sequence is then implemented semi-automatically pending user and/or security system provider review/approval.

In one embodiment, the at least two of the two or more filters/stages are monitored periodically, such as every minute, multiple minutes, hours, days, weeks, etc. In one embodiment, the at least two of the two or more filters/stages are monitored continuously. In one embodiment, the analysis to determine a cost/use profile for each filter/stage is repeated periodically, such as every minute, multiple minutes, hours, days, weeks, etc. In one embodiment, the optimal filter/stage sequence is updated periodically, such as every minute, multiple minutes, hours, days, weeks, etc. As a result, in one embodiment, a new/updated optimal filter/stage sequence is implemented/re-implemented periodically, such as every minute, multiple minutes, hours, days, weeks, etc.

Using the method and apparatus for dynamically and automatically optimizing multiple filter/stage security systems, as discussed herein, a multiple filter/stage security system is dynamically, and in one embodiment automatically, adjusted so the multiple filter/stage security system can effectively and efficiently respond to the highly dynamic nature, volume, and variety of undesirable content currently being propagated, without performing unnecessary and/or redundant analysis. Consequently, using the method and apparatus for dynamically and automatically optimizing multiple filter/stage security systems, as discussed herein, significant amounts of resources can be saved, and/or be put to more effective use, while still providing at least the same level, or better, of protection. In addition, using the method and apparatus for dynamically and automatically optimizing multiple filter/stage security systems, as discussed herein, a multiple filter/stage security system is dynamically, and in one embodiment automatically, adjusted to meet the specific needs of a given user based on the individual user's actual usage/traffic data and/or defined priorities. Consequently, using the method and apparatus for dynamically and automatically optimizing multiple filter/stage security systems, as discussed herein, both providers of multiple filter/stage security systems and user are benefited.

Figure 1:
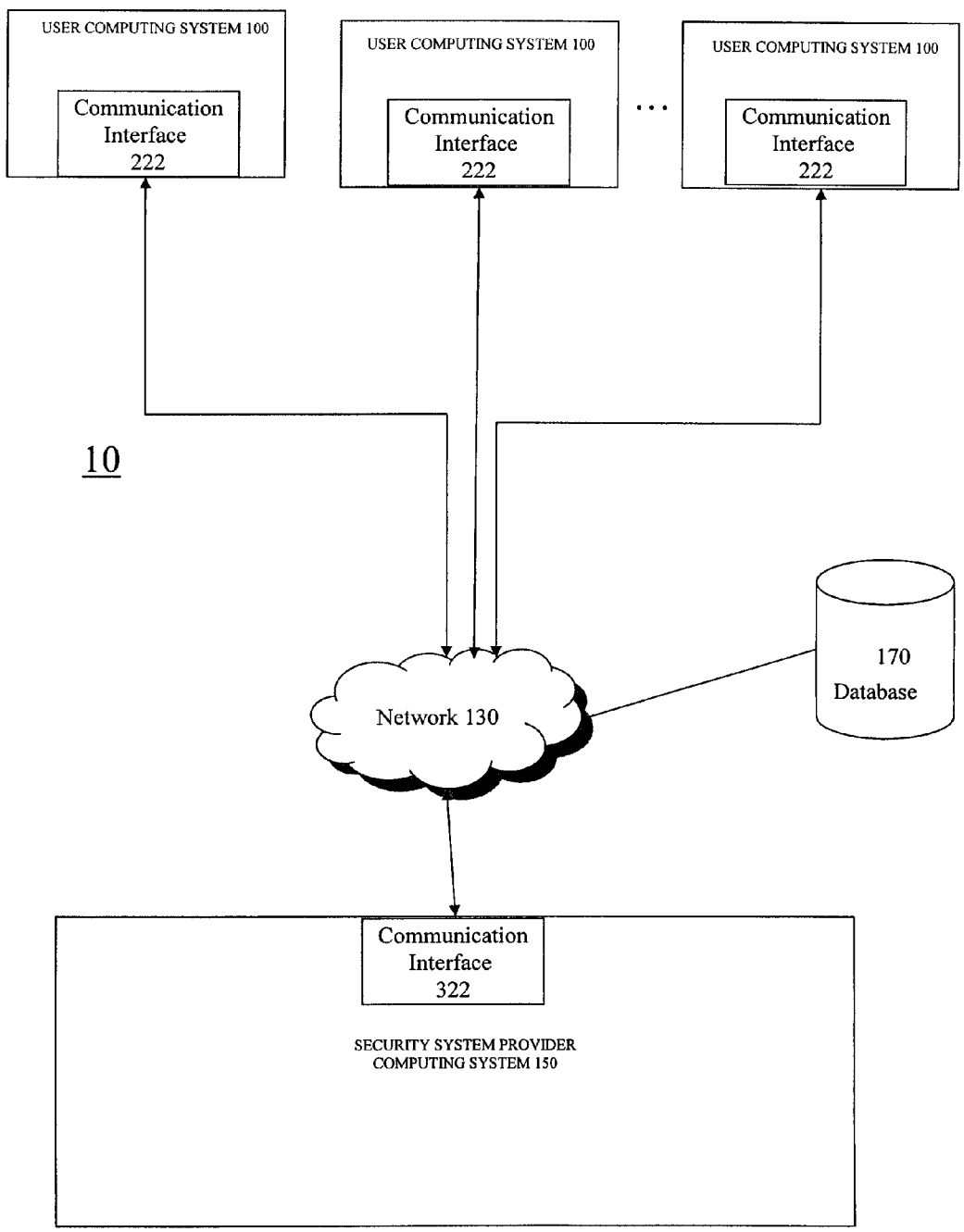
FIG. 1 is a block diagram of an exemplary hardware architecture for implementing one embodiment including user computing systems, a communication network, a database, and a security system provider computing system, in accordance with one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. The following description includes reference to specific embodiments for illustrative purposes. However, the illustrative discussion below is not intended to be exhaustive or to limit the invention to the precise forms disclosed. Many modifications and variations are possible in view of the teachings below. The embodiments discussed below were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIG.s, and/or described below.

According to one embodiment of a method and apparatus for dynamically and automatically optimizing multiple filter/stage security systems, a given multiple filter/stage security system is provided that includes two or more filters or "stages". In one embodiment, the given multiple filter/stage security system is initially implemented such that the two or more filters/stages are used in an initial order such that a given e-mail, IM, or file is subjected to each filter/stage in a defined initial sequence. In one embodiment, at least two of the two or more filters/stages are monitored to determine the composite "cost" and/or effectiveness of each filter/stage. In one embodiment, data representing the results of the monitoring of the at least two of the two or more filters/stages is analyzed to determine a cost/use profile for each filter/stage. In one embodiment, the cost/use profile for each filter/stage is then analyzed to determine an optimal order of the at least two of the two or more filters/stages, i.e., an optimal filter/stage sequence, based on actual filter/stage use, actual composite filter/stage cost, and/or user and/or system defined priorities. In one embodiment, the optimal filter/stage sequence is then implemented. In one embodiment, the at least two of the two or more filters/stages are periodically, and/or continuously, monitored, the analysis to determine a cost/use profile for each filter/stage is repeated periodically, the optimal filter/stage sequence is updated periodically, and a new/updated optimal filter/stage sequence is implemented/re-implemented periodically.

FIG. 1 shows a block diagram of an exemplary hardware system 10 suitable for implementing one embodiment of a process for dynamically and automatically optimizing multiple filter/stage security systems, such as exemplary process 400 of FIG. 4 discussed below.

Returning to FIG. 1, exemplary hardware system 10 includes: one or more user computing system(s) 100, including communication interface(s) 222; security system provider computing system 150, including communication interface 322; and database 170; all communicating via communication interfaces 222 and 322 and network 130.

In one embodiment, one or more of user computing system(s) 100 are client computing systems. In one embodiment, one or more of user computing system(s) 100 are server computing systems that are, in turn, associated with one or more client computing systems. In one embodiment, one or more of user computing system(s) 100 are representative of multiple user computing systems. In one embodiment, one or more of user computing system(s) 100 are part of a cloud computing environment. In one embodiment, user computing system(s) 100 are used, and/or are accessible, by another computing system, such as security system provider computing system 150 (discussed below) or any one or more of other user computing system(s) 100.

As used herein, the term "computing system", such as is included in the terms "user computing system" and "security system provider computing system" includes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In various embodiments, user computing system(s) 100 can be any computing system as defined herein and/or as known in the art at the time of filing and/or as developed thereafter, that includes components that can execute all, or part, of a process for dynamically and automatically optimizing multiple filter/stage security systems in accordance with at least one of the embodiments as described herein. A more detailed discussion of user computing system(s) 100 is provided below with respect to FIG. 2.

Returning to FIG. 1, in one embodiment, security system provider computing system 150 is any computing system as defined herein and/or as known in the art at the time of filing and/or as developed thereafter, that includes components that can execute all, or part, of a process for dynamically and automatically optimizing multiple filter/stage security systems in accordance with at least one of the embodiments as described herein and is accessible by, controlled by, and/or otherwise associated with, a security system provider. As used herein, a security system provider includes, but is not limited to, any party, person, application, system, or entity that desires to identify and block undesirable content.

In one embodiment, security system provider computing system 150 is representative of two or more security system provider computing systems. In one embodiment, security system provider computing system 150 is a client computing system associated with one or more server computing systems. In one embodiment, security system provider computing system 150 is a server computing system that is, in turn, associated with one or more client computing systems that are users of one more security systems provided through, or monitored by, the security system provider associated with security system provider computing system 150. In one embodiment, security system provider computing system 150 is part of a cloud computing environment. A more detailed discussion of security system provider computing system 150 is provided below with respect to FIG. 3.

Also shown in FIG. 1 is database 170. In one embodiment, database 170 is a data storage device, a designated server system or computing system, or a designated portion of one or more server systems or computing systems, such as computing system(s) 100 and/or security system provider computing system 150, or a distributed database, or an external and/or portable hard drive. In one embodiment, database 170 is a dedicated mass storage device implemented in software, hardware, or a combination of hardware and software. In one embodiment, database 170 is a web-based function. As discussed in more detail below, in one embodiment, database 170 is under the control of, or otherwise accessible by, a process for dynamically and automatically optimizing multiple filter/stage security systems, and/or a provider of a security system and/or a security system provider computing system 150. In one embodiment, database 170 is part of a cloud computing environment.

In one embodiment, computing system(s) 100, security system provider computing system 150, and database 170, are coupled through network 130. In various embodiments, network 130 is any network, communications network, or network/communications network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, as discussed herein, and/or available or known at the time of filing, and/or as developed after the time of filing.

In one embodiment, computing system(s) 100, security system provider computing system 150, and database 170, are coupled in a cloud computing environment.

Figure 2:
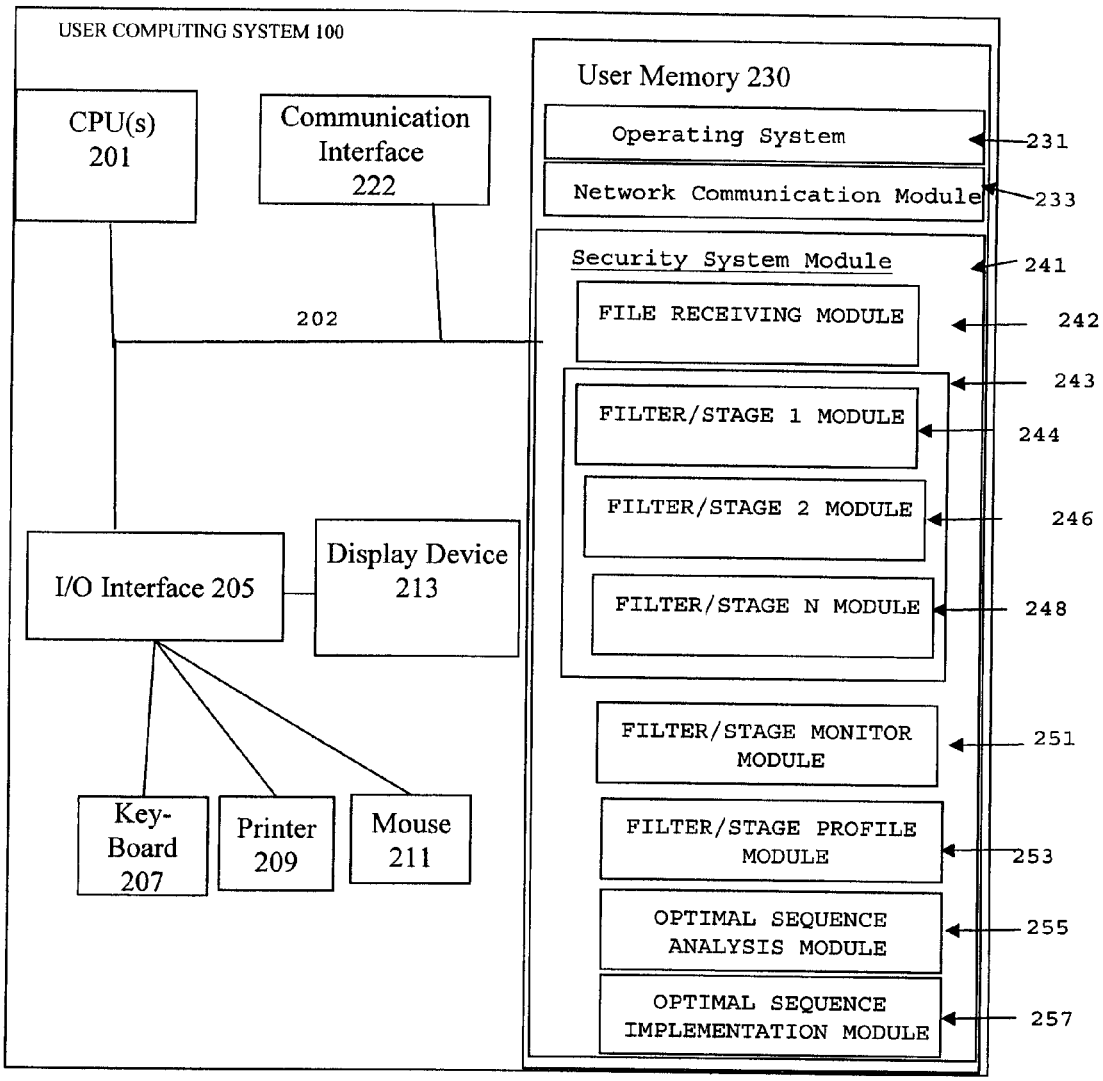
FIG. 2 is a block diagram of an exemplary user computing system of FIG. 1, in accordance with one embodiment.

FIG. 2 is a more detailed block diagram of an exemplary user computing system(s) 100. As seen in FIG. 2, in one embodiment, user computing system(s) 100 include(s) one or more Central Processing Unit(s), CPU(s) 201; user memory 230; at least one communication interface 222; an Input/Output interface, I/O interface 205, including one or more user interface devices such as display device 213, keyboard 207, printer 209, and/or mouse 211; all interconnected by one or more communication buses 202

As also seen in FIG. 2, in one embodiment, user memory 230 can store data and/or instructions associated with, but not limited to, the following elements, subsets of elements, and/or super sets of elements for processing by one or more processors, such as CPU(s) 201 (FIG. 2) and/or 301 (FIG. 3): operating system 231 that includes procedures, data, and/or instructions for handling various services and performing/coordinating hardware dependent tasks; network communications module 233 that includes procedures, data, and/or instructions, for, along with communication interface 222, connecting user computing system(s) 100 to other computing systems, such as other user computing system(s) 100 and/or security system provider computing system 150 of FIG. 1, and/or a network, such as network 130 of FIG. 1, and/or a database, such as database 170 of FIG. 1; and security system module 241 (FIG. 2) that includes procedures, data, and/or instructions, for intercepting and/or analyzing and/or filtering e-mails, IMs, and/or any files being sent to, or through, user computing system(s) 100 and/or security system provider computing system 150 of FIG. 1 to identify and block undesirable content.

As also seen in FIG. 2, in one embodiment, security system module 241 of user memory 230 includes: file receiving module 242 for receiving/intercepting e-mails, IMs, and/or other files sent to user computing system(s) 100 via communication interface 222 and/or security system provider computing system 150 of FIG. 1.; multiple filter/stage security system module 243 that includes procedures, data, and/or instructions to identify and block undesirable content and includes filter/stage 1 module 244, filter/stage 2 module 246, and filter/stage "n" module 248, each being implemented to detect, block, or filter out, a specific type of undesirable content and/or detect, block, or filter out, undesirable content based on specific parameters/tests; filter/stage monitor module 251 that includes procedures, data, and/or instructions to monitor each filter/stage of multiple filter/stage security system module 243 to determine the composite "cost" and/or effectiveness of each filter/stage, such as filter/stage 1, filter/stage 2, and filter/stage "n"; filter/stage profile module 253 that includes procedures, data, and/or instructions to analyze data from filter/stage monitor module 251 to determine a cost/use profile for each filter/stage; optimal sequence analysis module 255 that includes procedures, data, and/or instructions to analyze the cost/use profile for each filter/stage from filter/stage profile module 253 to determine an optimal order of the at least two of the two or more filters/stages, i.e., an optimal filter/stage sequence; and optimal sequence implementation module 257 that includes procedures, data, and/or instructions to implement the optimal filter/stage sequence determined from optimal sequence analysis module 255.

Those of skill in the art will readily recognize that the choice of components, data, modules, and information shown in FIG. 2, the organization of the components, data, modules, and information shown in FIG. 2, and the manner of storage and location of storage of the data, modules, and information shown in FIG. 2 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 2 are illustrative only and not limiting. In various other embodiments, the particular modules and/or data shown in FIG. 2 can be grouped together in fewer modules and/or data locations or divided among more modules and/or data locations. Consequently, those of skill in the art will recognize that other orders and/or grouping are possible and the particular modules and/or data, order, and/or grouping shown in FIG. 2 discussed herein do not limit the scope as claimed below.

A more detailed discussion of the operation of exemplary user computing system(s) 100, user memory 230, and security system module 241 of user memory 230, is provided below with respect to FIG. 4.

Figure 3:
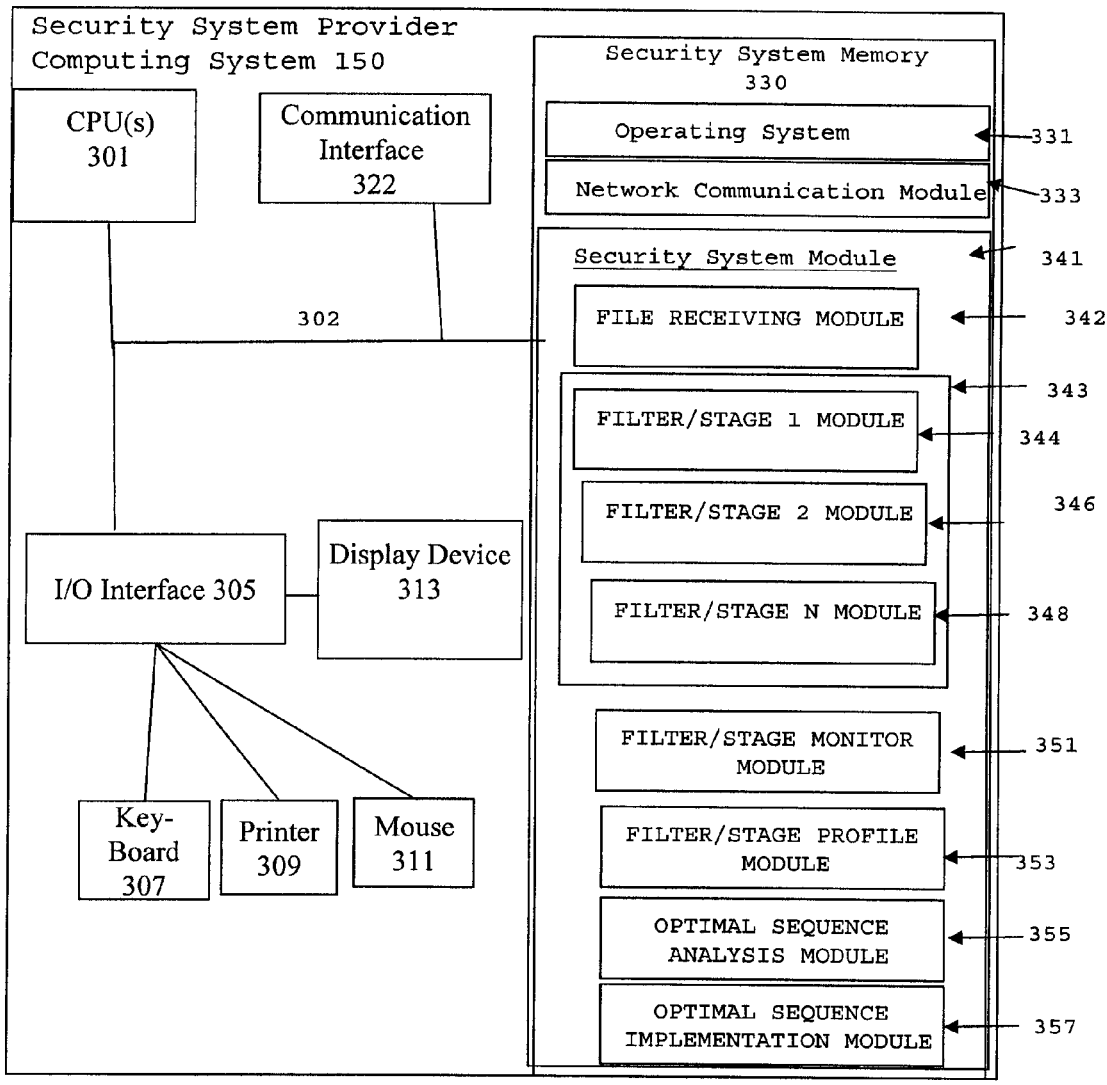
FIG. 3 is a block diagram of an exemplary security system provider computing system of FIG. 1, in accordance with one embodiment.

FIG. 3 is a more detailed block diagram of an exemplary security system provider computing system 150. As seen in FIG. 3, in one embodiment, security system provider computing system 150 includes one or more Central Processing Unit(s), CPU(s) 301; security system memory system 330; at least one communication interface 322; an Input/Output interface, I/O interface 305, including one or more user interface devices such as display device 313, keyboard 307, printer 309, and/or mouse 311; all interconnected by one or more communication buses 302.

As also seen in FIG. 3, in one embodiment, security system memory system 330 can store data and/or instructions associated with, but not limited to, the following elements, subsets of elements, and/or super sets of elements for use in processing by one or more processors, such as CPU(s) 201 (FIG. 2) and/or 301 (FIG. 3): operating system 331 that includes procedures, data, and/or instructions for handling various services and performing/coordinating hardware dependent tasks; network communications module 333 that includes procedures, data, and/or instructions, for, along with communication interface 322, connecting security system provider computing system 150 to other computing systems, such as user computing system(s) 100 and/or another security system provider computing system, and/or a network, such as network 130 of FIG. 1, and/or a database, such as database 170 of FIG. 1; and security system module 341 (FIG. 3) that includes procedures, data, and/or instructions, for intercepting and/or analyzing and/or filtering e-mails, IMs, and/or any files being sent to, or through, user computing system(s) 100 and/or security system provider computing system 150 of FIG. 1 to identify and block undesirable content.

As also seen in FIG. 3, in one embodiment, security system module 341 of security system memory 330 includes: file receiving module 342 for receiving/intercepting e-mails, IMs, and/or other files sent to user computing system(s) 100 via communication interface 222 and/or security system provider computing system 150 of FIG. 1.; multiple filter/stage security system module 343 that includes procedures, data, and/or instructions to identify and block undesirable content and includes filter/stage 1 module 344, filter/stage 2 module 346, and filter/stage "n" module 348 each being implemented to detect, block, or filter out, a specific type of undesirable content and/or detect, block, or filter out, undesirable content based on specific parameters/tests; filter/stage monitor module 351 that includes procedures, data, and/or instructions to monitor each filter/stage of multiple filter/stage security system module 343 to determine the composite "cost" and/or effectiveness of each filter/stage, such as filter/stage 1, filter/stage 2, and filter/stage "n"; filter/stage profile module 353 that includes procedures, data, and/or instructions to analyze data from filter/stage monitor module 351 to determine a cost/use profile for each filter/stage; optimal sequence analysis module 355 that includes procedures, data, and/or instructions to analyze the cost/use profile for each filter/stage from filter/stage profile module 353 to determine an optimal order of the at least two of the two or more filters/stages, i.e., an optimal filter/stage sequence; and optimal sequence implementation module 357 that includes procedures, data, and/or instructions to implement the optimal filter/stage sequence determined from optimal sequence analysis module 355.

Those of skill in the art will readily recognize that the choice of components, data, modules, and information shown in FIG. 3, the organization of the components, data, modules, and information shown in FIG. 3, and the manner of storage and location of storage of the data, modules, and information shown in FIG. 3 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 3 are illustrative only and not limiting. In various other embodiments, the particular modules and/or data shown in FIG. 3 can be grouped together in fewer modules and/or data locations or divided among more modules and/or data locations. Consequently, those of skill in the art will recognize that other orders and/or grouping are possible and the particular modules and/or data, order, and/or grouping shown in FIG. 3 discussed herein do not limit the scope as claimed below.

A more detailed discussion of the operation of exemplary security system provider computing system 150, security system memory system 330, security system module 334 of security system memory system 330, and user data module 343 of security system memory system 330 is provided below with respect to FIG. 4.

Figure 4:
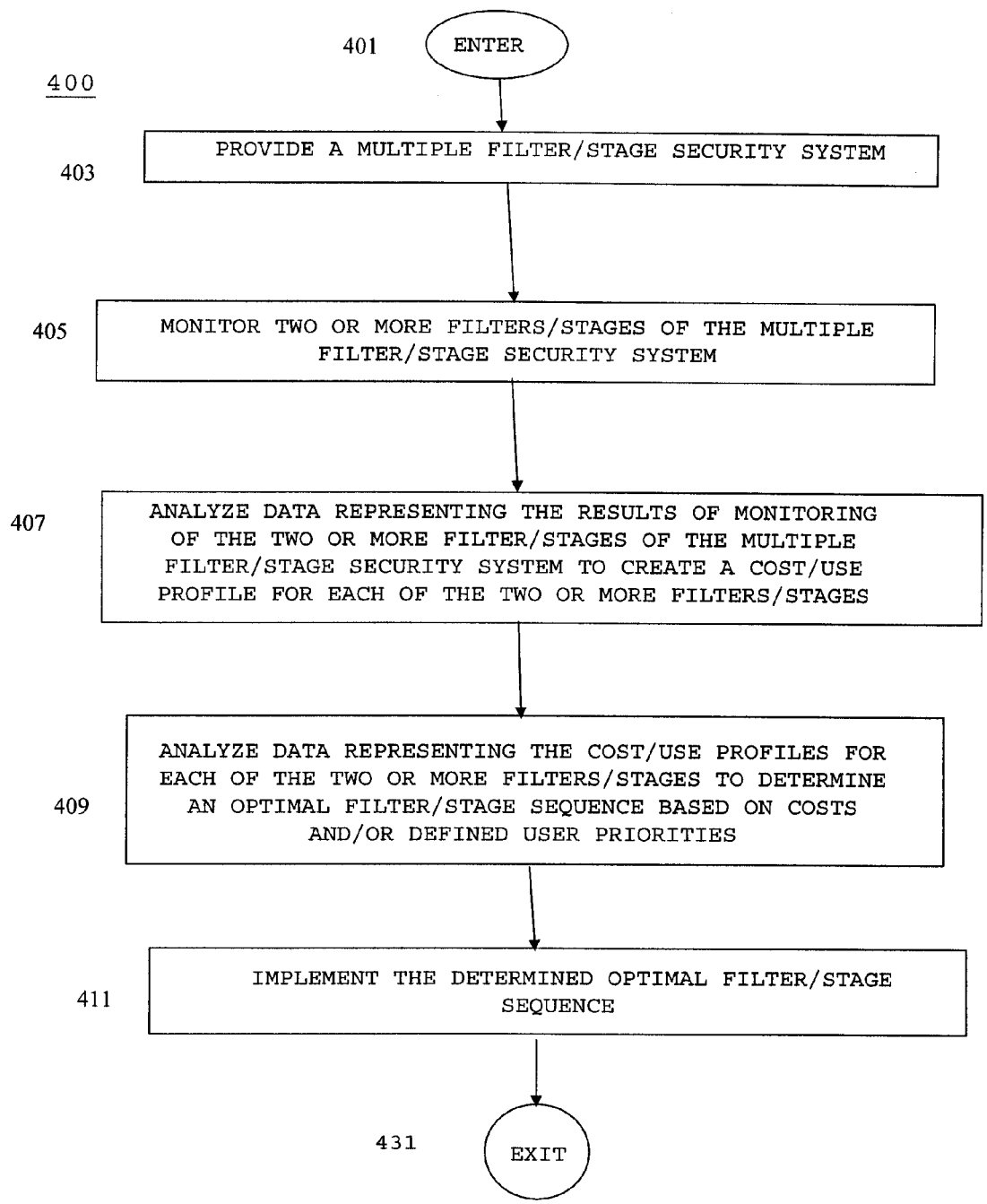
FIG. 4 is a flow chart depicting a process for dynamically and automatically optimizing multiple filter/stage security systems in accordance with one embodiment.

FIG. 4 is a flow chart depicting a process for dynamically and automatically optimizing multiple filter/stage security systems 400 in accordance with one embodiment.

Process for dynamically and automatically optimizing multiple filter/stage security systems 400 begins at ENTER OPERATION 401 and process flow proceeds to PROVIDE A MULTIPLE FILTER/STAGE SECURITY SYSTEM OPERATION 403.

In one embodiment, at PROVIDE A MULTIPLE FILTER/STAGE SECURITY SYSTEM OPERATION 403 a given multiple filter/stage security system is provided that includes two or more filters or "stages".

In one embodiment, at PROVIDE A MULTIPLE FILTER/STAGE SECURITY SYSTEM OPERATION 403 the given multiple filter/stage security system is implemented, at least in part, locally on a user computing system, such as user computing system 100 of FIGS. 1 and 2, via a security system module, such as security system module 241 of user memory 230, of user computing system 100 of FIGS. 1 and 2.

Returning to FIG. 4, in one embodiment, at PROVIDE A MULTIPLE FILTER/STAGE SECURITY SYSTEM OPERATION 403 the given multiple filter/stage security system is implemented, at least in part, remotely on a security system provider computing system, such as security system provider computing system 150 of FIGS. 1 and 3, via a security system module, such as security system module 341 of security system memory 330, of security system provider computing system 150 of FIGS. 1 and 3, and/or any computing system otherwise associated with the security system provider.

Returning to FIG. 4, in one embodiment, at PROVIDE A MULTIPLE FILTER/STAGE SECURITY SYSTEM OPERATION 403 the given multiple filter/stage security system provided is a software application, a software module, a hardware device, and/or a combination of software and hardware, implemented, in whole or in part: on a given user's computing system, such as user computing system(s) 100 of FIGS. 1 and 2; on a security system provider's computing system, such as security system provider computing system 150 of FIGS. 1 and 3; on a third party computing system; on a server computing system; or on any combination of a given user's computing system, a security system provider's computing system, a server computing system, and/or a third party computing system.

Returning to FIG. 4, in one embodiment, at PROVIDE A MULTIPLE FILTER/STAGE SECURITY SYSTEM OPERATION 403 the given multiple filter/stage security system provided includes two or more filters or "stages", provided, in one embodiment, via filter/stage modules, such as filter stage modules 244, 246, 248, 344, 346, and 348, of FIGS. 2 and 3, with each filter/stage being implemented to detect, block, or filter out, a specific type of undesirable content and/or detect, block, or filter out, undesirable content based on specific parameters/tests.

Returning to FIG. 4, in one embodiment, at PROVIDE A MULTIPLE FILTER/STAGE SECURITY SYSTEM OPERATION 403 the given multiple filter/stage security system is initially implemented such that the two or more filters/stages are used in an initial order such that a given e-mail, IM, or file is subjected to each filter/stage in a defined initial sequence.

In one embodiment, at PROVIDE A MULTIPLE FILTER/STAGE SECURITY SYSTEM OPERATION 403 the given multiple filter/stage security system is initially implemented such that the two or more filters/stages are used in a defined initial sequence based on theoretical estimates of the cost associated with each the two or more filters/stages and/or based on a perceived threat and/or based on user priorities.

In one embodiment, each filter/stage of the multiple filter/stage security system has an associated filter/stage cost. As discussed above, this filter/stage cost is typically made up of, but is not limited to, one or more of the following filter/stage cost components: the cost of capital equipment necessary to implement the given filter/stage, e.g., the cost of the servers, routers, and other hardware necessary to implement the given filter/stage; the hosting costs associated with the given filter/stage, such as data center costs associated with the given filter/stage; the processing costs associated with the given filter/stage, e.g., the processor time and/or cycles associated with implementing the given filter/stage; database access and access time associated with implementing the given filter/stage; disk access time associated with implementing the given filter/stage; Input/Output (I/O) latencies associated with implementing the given filter/stage; and/or various other costs associated with implementing each filter/stage.

Methods, means, mechanisms, procedures and processes for initially creating and operating a multiple filter/stage security system are well known to those of skill in the art. Consequently, a more detailed discussion of specific methods, means, mechanisms, procedures and processes for initially creating and operating a given multiple filter/stage security system is omitted here to avoid detracting from the invention.

In one embodiment, once a given multiple filter/stage security system is provided that includes two or more filters/stages at PROVIDE A MULTIPLE FILTER/STAGE SECURITY SYSTEM OPERATION 403, process flow proceeds to MONITOR TWO OR MORE FILTERS/STAGES OF THE MULTIPLE FILTER/STAGE SECURITY SYSTEM OPERATION 405.

In one embodiment, at MONITOR TWO OR MORE FILTERS/STAGES OF THE MULTIPLE FILTER/STAGE SECURITY SYSTEM OPERATION 405 at least two of the two or more filters/stages of the given multiple filter/stage security system provided at PROVIDE A MULTIPLE FILTER/STAGE SECURITY SYSTEM OPERATION 403 are monitored to determine the composite "cost" and/or effectiveness of each filter/stage.

In one embodiment, at MONITOR TWO OR MORE FILTERS/STAGES OF THE MULTIPLE FILTER/STAGE SECURITY SYSTEM OPERATION 405 the at least two of the two or more filters/stages are monitored to determine the cost of each filter/stage and/or the effectiveness of each filter/stage, at least in part, locally on a user computing system, such as user computing system 100 of FIGS. 1 and 2, via a filter/stage monitor module, such as filter/stage monitor module 251 of user memory 230, of user computing system 100 of FIGS. 1 and 2.

Returning to FIG. 4, in one embodiment, at MONITOR TWO OR MORE FILTERS/STAGES OF THE MULTIPLE FILTER/STAGE SECURITY SYSTEM OPERATION 405 the at least two of the two or more filters/stages are monitored to determine the cost of each filter/stage and/or the effectiveness of each filter/stage, at least in part, remotely on a security system provider computing system, such as security system provider computing system 150 of FIGS. 1 and 3, via a filter/stage monitor module, such as filter/stage monitor module 351 of security system provider computing system 150 of FIGS. 1 and 3, and/or a computing system otherwise associated with the security system provider.

Returning to FIG. 4, in one embodiment, at MONITOR TWO OR MORE FILTERS/STAGES OF THE MULTIPLE FILTER/STAGE SECURITY SYSTEM OPERATION 405 the at least two of the two or more filters/stages are monitored to determine the cost of each filter/stage and/or the effectiveness of each filter/stage, at least in part, by a third party.

In one embodiment, at MONITOR TWO OR MORE FILTERS/STAGES OF THE MULTIPLE FILTER/STAGE SECURITY SYSTEM OPERATION 405 at least two of the two or more filters/stages are monitored to determine the cost of each filter/stage and/or the effectiveness of each filter/stage by monitoring one or more of the following cost/use parameters: the cost of capital equipment necessary to implement the given filter/stage, e.g., the cost of the servers, routers, and other hardware necessary to implement the given filter/stage; the hosting costs associated with the given filter/stage, such as data center costs associated with the given filter/stage; the processing costs associated with the given filter/stage, e.g., the processor time and/or cycles associated with implementing the given filter/stage; database access and lookups and access time associated with implementing the given filter/stage; disk access time associated with implementing the given filter/stage; Input/Output (I/O) latencies associated with implementing the given filter/stage; the actual number and/or proportion of e-mails, IMs, and/or files blocked by the given filter/stage; the actual or "real" positive results obtained, i.e., the number/proportion of e-mails, IMs, and/or files blocked by the given filter/stage that actually included, or were, undesirable content; the number of "false" positive results obtained, i.e., the number/proportion of e-mails, IMs, and/or files blocked by the given filter/stage that did not include undesirable content; and/or any other costs associated with implementing each filter/stage desired by the provider of the method and apparatus for dynamically and automatically optimizing multiple filter/stage security systems and/or one or more users of the method and apparatus for dynamically and automatically optimizing multiple filter/stage security systems.

In one embodiment, once at least two of the two or more filters/stages of the given multiple filter/stage security system provided at PROVIDE A MULTIPLE FILTER/STAGE SECURITY SYSTEM OPERATION 403 are monitored to determine the composite "cost" and/or effectiveness of each filter/stage at MONITOR TWO OR MORE FILTERS/STAGES OF THE MULTIPLE FILTER/STAGE SECURITY SYSTEM OPERATION 405, process flow proceeds to ANALYZE DATA REPRESENTING THE RESULTS OF MONITORING OF THE TWO OR MORE FILTER/STAGES OF THE MULTIPLE FILTER/STAGE SECURITY SYSTEM TO CREATE A COST/USE PROFILE FOR EACH OF THE TWO OR MORE FILTERS/STAGES OPERATION 407.

In one embodiment, at ANALYZE DATA REPRESENTING THE RESULTS OF MONITORING OF THE TWO OR MORE FILTER/STAGES OF THE MULTIPLE FILTER/STAGE SECURITY SYSTEM TO CREATE A COST/USE PROFILE FOR EACH OF THE TWO OR MORE FILTERS/STAGES OPERATION 407 data representing the results of the monitoring of the at least two of the two or more filters/stages of MONITOR TWO OR MORE FILTERS/STAGES OF THE MULTIPLE FILTER/STAGE SECURITY SYSTEM OPERATION 405 is analyzed to determine a cost/use profile for each filter/stage of the at least two of the two or more filters/stages.

In one embodiment, at ANALYZE DATA REPRESENTING THE RESULTS OF MONITORING OF THE TWO OR MORE FILTER/STAGES OF THE MULTIPLE FILTER/STAGE SECURITY SYSTEM TO CREATE A COST/USE PROFILE FOR EACH OF THE TWO OR MORE FILTERS/STAGES OPERATION 407 data representing the results of the monitoring of the at least two of the two or more filters/stages of MONITOR TWO OR MORE FILTERS/STAGES OF THE MULTIPLE FILTER/STAGE SECURITY SYSTEM OPERATION 405 is analyzed to determine a cost/use profile for each filter/stage of the at least two of the two or more filters/stages using one or more processors associated with a user computing system, such as CPU(s) 201 of user computing system 100 of FIGS. 1 and 2.

Returning to FIG. 4, in one embodiment, at ANALYZE DATA REPRESENTING THE RESULTS OF MONITORING OF THE TWO OR MORE FILTER/STAGES OF THE MULTIPLE FILTER/STAGE SECURITY SYSTEM TO CREATE A COST/USE PROFILE FOR EACH OF THE TWO OR MORE FILTERS/STAGES OPERATION 407 data representing the results of the monitoring of the at least two of the two or more filters/stages of MONITOR TWO OR MORE FILTERS/STAGES OF THE MULTIPLE FILTER/STAGE SECURITY SYSTEM OPERATION 405 is analyzed to determine a cost/use profile for each filter/stage of the at least two of the two or more filters/stages using one or more processors associated with a security system provider computing system, such as CPU(s) 301 of security system provider computing system 150 of FIGS. 1 and 3.

Returning to FIG. 4, in one embodiment, at ANALYZE DATA REPRESENTING THE RESULTS OF MONITORING OF THE TWO OR MORE FILTER/STAGES OF THE MULTIPLE FILTER/STAGE SECURITY SYSTEM TO CREATE A COST/USE PROFILE FOR EACH OF THE TWO OR MORE FILTERS/STAGES OPERATION 407 data representing the results of the monitoring of the at least two of the two or more filters/stages of MONITOR TWO OR MORE FILTERS/STAGES OF THE MULTIPLE FILTER/STAGE SECURITY SYSTEM OPERATION 405 is analyzed to determine a cost/use profile for each filter/stage of the at least two of the two or more filters/stages using one or more processors associated with any computing system, as discussed herein, and/or as known in the art at the time of filing, and/or as developed after the time of filing.

In one embodiment, at ANALYZE DATA REPRESENTING THE RESULTS OF MONITORING OF THE TWO OR MORE FILTER/STAGES OF THE MULTIPLE FILTER/STAGE SECURITY SYSTEM TO CREATE A COST/USE PROFILE FOR EACH OF THE TWO OR MORE FILTERS/STAGES OPERATION 407 data representing the results of the monitoring of the at least two of the two or more filters/stages of MONITOR TWO OR MORE FILTERS/STAGES OF THE MULTIPLE FILTER/STAGE SECURITY SYSTEM OPERATION 405 is analyzed to determine a cost/use profile for each filter/stage of the at least two of the two or more filters/stages using a filter/stage profile module, such as filter/stage profile module 253 of user computing system 100 of FIGS. 1 and 2.

In one embodiment, at ANALYZE DATA REPRESENTING THE RESULTS OF MONITORING OF THE TWO OR MORE FILTER/STAGES OF THE MULTIPLE FILTER/STAGE SECURITY SYSTEM TO CREATE A COST/USE PROFILE FOR EACH OF THE TWO OR MORE FILTERS/STAGES OPERATION 407 data representing the results of the monitoring of the at least two of the two or more filters/stages of MONITOR TWO OR MORE FILTERS/STAGES OF THE MULTIPLE FILTER/STAGE SECURITY SYSTEM OPERATION 405 is analyzed to determine a cost/use profile for each filter/stage of the at least two of the two or more filters/stages using a filter/stage profile module, such as filter/stage profile module 353 of security system provider computing system 150 of FIGS. 1 and 3.

In one embodiment, at ANALYZE DATA REPRESENTING THE RESULTS OF MONITORING OF THE TWO OR MORE FILTER/STAGES OF THE MULTIPLE FILTER/STAGE SECURITY SYSTEM TO CREATE A COST/USE PROFILE FOR EACH OF THE TWO OR MORE FILTERS/STAGES OPERATION 407 data representing the results of the monitoring of the at least two of the two or more filters/stages of MONITOR TWO OR MORE FILTERS/STAGES OF THE MULTIPLE FILTER/STAGE SECURITY SYSTEM OPERATION 405 is analyzed to determine a cost/use profile for each filter/stage and the cost/use profile for each filter/stage includes data representing, but not limited to, one or more of the following cost/use profile parameters: the cost of capital equipment necessary to implement the given filter/stage, e.g., the cost of the servers, routers, and other hardware necessary to implement the given filter/stage; the hosting costs associated with the given filter/stage, such as data center costs associated with the given filter/stage; the processing costs associated with the given filter/stage, e.g., the processor time and/or cycles associated with implementing the given filter/stage; database access and lookups and access time associated with implementing the given filter/stage; disk access time associated with implementing the given filter/stage; Input/Output (I/O) latencies associated with implementing the given filter/stage; the actual number and/or proportion of e-mails, IMs, and/or files blocked by the given filter/stage; the actual or "real" positive results obtained, i.e., the number/proportion of e-mails, IMs, and/or files blocked by the given filter/stage that actually included, or were, undesirable content; the number of "false" positive results obtained, i.e., the number/proportion of e-mails, IMs, and/or files blocked by the given filter/stage that did not include undesirable content; and/or any other costs associated with implementing each filter/stage desired by the provider of the method and apparatus for dynamically and automatically optimizing multiple filter/stage security systems and/or one or more users of the method and apparatus for dynamically and automatically optimizing multiple filter/stage security systems.

In one embodiment, at ANALYZE DATA REPRESENTING THE RESULTS OF MONITORING OF THE TWO OR MORE FILTER/STAGES OF THE MULTIPLE FILTER/STAGE SECURITY SYSTEM TO CREATE A COST/USE PROFILE FOR EACH OF THE TWO OR MORE FILTERS/STAGES OPERATION 407 the cost/use profile parameters are prioritized by the provider of process for dynamically and automatically optimizing multiple filter/stage security systems 400, and/or one or more users of process for dynamically and automatically optimizing multiple filter/stage security systems 400.

In one embodiment, once data representing the results of the monitoring of the at least two of the two or more filters/stages of MONITOR TWO OR MORE FILTERS/STAGES OF THE MULTIPLE FILTER/STAGE SECURITY SYSTEM OPERATION 405 is analyzed to determine a cost/use profile for each filter/stage of the at least two of the two or more filters/stages at ANALYZE DATA REPRESENTING THE RESULTS OF MONITORING OF THE TWO OR MORE FILTER/STAGES OF THE MULTIPLE FILTER/STAGE SECURITY SYSTEM TO CREATE A COST/USE PROFILE FOR EACH OF THE TWO OR MORE FILTERS/STAGES OPERATION 407, process flow proceeds to ANALYZE DATA REPRESENTING THE COST/USE PROFILES FOR EACH OF THE TWO OR MORE FILTERS/STAGES TO DETERMINE AN OPTIMAL FILTER/STAGE SEQUENCE BASED ON COSTS AND/OR DEFINED USER PRIORITIES OPERATION 409.

In one embodiment, at ANALYZE DATA REPRESENTING THE COST/USE PROFILES FOR EACH OF THE TWO OR MORE FILTERS/STAGES TO DETERMINE AN OPTIMAL FILTER/STAGE SEQUENCE BASED ON COSTS AND/OR DEFINED USER PRIORITIES OPERATION 409 the cost/use profile for each filter/stage of ANALYZE DATA REPRESENTING THE RESULTS OF MONITORING OF THE TWO OR MORE FILTER/STAGES OF THE MULTIPLE FILTER/STAGE SECURITY SYSTEM TO CREATE A COST/USE PROFILE FOR EACH OF THE TWO OR MORE FILTERS/STAGES OPERATION 407 is analyzed to determine an optimal order of the at least two of the two or more filters/stages of the given multiple filter/stage security system of PROVIDE A MULTIPLE FILTER/STAGE SECURITY SYSTEM OPERATION 403, i.e., an optimal filter/stage sequence, based on actual filter/stage use, actual composite filter/stage cost, and/or user and/or system defined priorities of ANALYZE DATA REPRESENTING THE RESULTS OF MONITORING OF THE TWO OR MORE FILTER/STAGES OF THE MULTIPLE FILTER/

STAGE SECURITY SYSTEM TO CREATE A COST/USE PROFILE FOR EACH OF THE TWO OR MORE FILTERS/STAGES OPERATION 407.

In one embodiment, at ANALYZE DATA REPRESENTING THE COST/USE PROFILES FOR EACH OF THE TWO OR MORE FILTERS/STAGES TO DETERMINE AN OPTIMAL FILTER/STAGE SEQUENCE BASED ON COSTS AND/OR DEFINED USER PRIORITIES OPERATION 409 the cost/use profile for each filter/stage of ANALYZE DATA REPRESENTING THE RESULTS OF MONITORING OF THE TWO OR MORE FILTER/STAGES OF THE MULTIPLE FILTER/STAGE SECURITY SYSTEM TO CREATE A COST/USE PROFILE FOR EACH OF THE TWO OR MORE FILTERS/STAGES OPERATION 407 is analyzed to determine an optimal sequence of the at least two of the two or more filters/stages of the given multiple filter/stage security system of PROVIDE A MULTIPLE FILTER/STAGE SECURITY SYSTEM OPERATION 403 using one or more processors associated with a user computing system, such as CPU(s) 201 of user computing system 100 of FIGS. 1 and 2.

Returning to FIG. 4, in one embodiment, at ANALYZE DATA REPRESENTING THE COST/USE PROFILES FOR EACH OF THE TWO OR MORE FILTERS/STAGES TO DETERMINE AN OPTIMAL FILTER/STAGE SEQUENCE BASED ON COSTS AND/OR DEFINED USER PRIORITIES OPERATION 409 the cost/use profile for each filter/stage of ANALYZE DATA REPRESENTING THE RESULTS OF MONITORING OF THE TWO OR MORE FILTER/STAGES OF THE MULTIPLE FILTER/STAGE SECURITY SYSTEM TO CREATE A COST/USE PROFILE FOR EACH OF THE TWO OR MORE FILTERS/STAGES OPERATION 407 is analyzed to determine an optimal sequence of the at least two of the two or more filters/stages of the given multiple filter/stage security system of PROVIDE A MULTIPLE FILTER/STAGE SECURITY SYSTEM OPERATION 403 using one or more processors associated with a security system provider computing system, such as CPU(s) 301 of security system provider computing system 150 of FIGS. 1 and 3.

Returning to FIG. 4, in one embodiment, at ANALYZE DATA REPRESENTING THE COST/USE PROFILES FOR EACH OF THE TWO OR MORE FILTERS/STAGES TO DETERMINE AN OPTIMAL FILTER/STAGE SEQUENCE BASED ON COSTS AND/OR DEFINED USER PRIORITIES OPERATION 409 the cost/use profile for each filter/stage of ANALYZE DATA REPRESENTING THE RESULTS OF MONITORING OF THE TWO OR MORE FILTER/STAGES OF THE MULTIPLE FILTER/STAGE SECURITY SYSTEM TO CREATE A COST/USE PROFILE FOR EACH OF THE TWO OR MORE FILTERS/STAGES OPERATION 407 is analyzed to determine an optimal sequence of the at least two of the two or more filters/stages of the given multiple filter/stage security system of PROVIDE A MULTIPLE FILTER/STAGE SECURITY SYSTEM OPERATION 403 using one or more processors associated with any computing system, as discussed herein, and/or as known in the art at the time of filing, and/or as developed after the time of filing.

In one embodiment, at ANALYZE DATA REPRESENTING THE COST/USE PROFILES FOR EACH OF THE TWO OR MORE FILTERS/STAGES TO DETERMINE AN OPTIMAL FILTER/STAGE SEQUENCE BASED ON COSTS AND/OR DEFINED USER PRIORITIES OPERATION 409 the cost/use profile for each filter/stage of ANALYZE DATA REPRESENTING THE RESULTS OF MONITORING OF THE TWO OR MORE FILTER/STAGES OF THE MULTIPLE FILTER/STAGE SECURITY SYSTEM TO CREATE A COST/USE PROFILE FOR EACH OF THE TWO OR MORE FILTERS/STAGES OPERATION 407 is analyzed to determine an optimal sequence of the at least two of the two or more filters/stages of the given multiple filter/stage security system of PROVIDE A MULTIPLE FILTER/STAGE SECURITY SYSTEM OPERATION 403 using an optimal sequence analysis module, such as optimal sequence analysis module 255 of user computing system 100 of FIGS. 1 and 2.

Returning to FIG. 4, in one embodiment, at ANALYZE DATA REPRESENTING THE COST/USE PROFILES FOR EACH OF THE TWO OR MORE FILTERS/STAGES TO DETERMINE AN OPTIMAL FILTER/STAGE SEQUENCE BASED ON COSTS AND/OR DEFINED USER PRIORITIES OPERATION 409 the cost/use profile for each filter/stage of ANALYZE DATA REPRESENTING THE RESULTS OF MONITORING OF THE TWO OR MORE FILTER/STAGES OF THE MULTIPLE FILTER/STAGE SECURITY SYSTEM TO CREATE A COST/USE PROFILE FOR EACH OF THE TWO OR MORE FILTERS/STAGES OPERATION 407 is analyzed to determine an optimal sequence of the at least two of the two or more filters/stages of the given multiple filter/stage security system of PROVIDE A MULTIPLE FILTER/STAGE SECURITY SYSTEM OPERATION 403 using an optimal sequence analysis module, such as optimal sequence analysis module 355 of security system provider computing system 150 of FIGS. 1 and 3.

In one embodiment, once the cost/use profile for each filter/stage of ANALYZE DATA REPRESENTING THE RESULTS OF MONITORING OF THE TWO OR MORE FILTER/STAGES OF THE MULTIPLE FILTER/STAGE SECURITY SYSTEM TO CREATE A COST/USE PROFILE FOR EACH OF THE TWO OR MORE FILTERS/STAGES OPERATION 407 is analyzed to determine an optimal order of the at least two of the two or more filters/stages of the given multiple filter/stage security system of PROVIDE A MULTIPLE FILTER/STAGE SECURITY SYSTEM OPERATION 403, i.e., an optimal filter/stage sequence, based on actual filter/stage use, actual composite filter/stage cost, and/or user and/or system defined priorities of ANALYZE DATA REPRESENTING THE RESULTS OF MONITORING OF THE TWO OR MORE FILTER/STAGES OF THE MULTIPLE FILTER/STAGE SECURITY SYSTEM TO CREATE A COST/USE PROFILE FOR EACH OF THE TWO OR MORE FILTERS/STAGES OPERATION 407 at ANALYZE DATA REPRESENTING THE COST/USE PROFILES FOR EACH OF THE TWO OR MORE FILTERS/STAGES TO DETERMINE AN OPTIMAL FILTER/STAGE SEQUENCE BASED ON COSTS AND/OR DEFINED USER PRIORITIES OPERATION 409, process flow proceeds to IMPLEMENT THE DETERMINED OPTIMAL FILTER/STAGE SEQUENCE OPERATION 411.

In one embodiment, at IMPLEMENT THE DETERMINED OPTIMAL FILTER/STAGE SEQUENCE OPERATION 411 the optimal filter/stage sequence of ANALYZE DATA REPRESENTING THE COST/USE PROFILES FOR EACH OF THE TWO OR MORE FILTERS/STAGES TO DETERMINE AN OPTIMAL FILTER/STAGE SEQUENCE BASED ON COSTS AND/OR DEFINED USER PRIORITIES OPERATION 409 is implemented. In addition, in one embodiment: the at least two of the two or more filters/stages of the multiple filter/stage security system of PROVIDE A MULTIPLE FILTER/STAGE SECURITY SYSTEM OPERATION 403 are periodically, and/or continuously, monitored at MONITOR TWO OR MORE FILTERS/ STAGES OF THE MULTIPLE FILTER/STAGE SECURITY SYSTEM OPERATION 405; the analysis to determine a cost/use profile for each filter/stage of ANALYZE DATA REPRESENTING THE RESULTS OF MONITORING OF THE TWO OR MORE FILTER/STAGES OF THE MULTIPLE FILTER/STAGE SECURITY SYSTEM TO CREATE A COST/USE PROFILE FOR EACH OF THE TWO OR MORE FILTERS/STAGES OPERATION 407 is repeated/updated periodically; the optimal filter/stage sequence of ANALYZE DATA REPRESENTING THE COST/USE PROFILES FOR EACH OF THE TWO OR MORE FILTERS/STAGES TO DETERMINE AN OPTIMAL FILTER/STAGE SEQUENCE BASED ON COSTS AND/OR DEFINED USER PRIORITIES OPERATION 409 is repeated/updated periodically; and a new/updated optimal filter/stage sequence is implemented/re-implemented periodically at IMPLEMENT THE DETERMINED OPTIMAL FILTER/STAGE SEQUENCE OPERATION 411.

In one embodiment, at IMPLEMENT THE DETERMINED OPTIMAL FILTER/STAGE SEQUENCE OPERATION 411 the optimal filter/stage sequence of ANALYZE DATA REPRESENTING THE COST/USE PROFILES FOR EACH OF THE TWO OR MORE FILTERS/STAGES TO DETERMINE AN OPTIMAL FILTER/STAGE SEQUENCE BASED ON COSTS AND/OR DEFINED USER PRIORITIES OPERATION 409 is provided to the filter supervisor and the optimal filter/stage sequence is then implemented automatically.

In one embodiment, at IMPLEMENT THE DETERMINED OPTIMAL FILTER/STAGE SEQUENCE OPERATION 411 the optimal filter/stage sequence of ANALYZE DATA REPRESENTING THE COST/USE PROFILES FOR EACH OF THE TWO OR MORE FILTERS/STAGES TO DETERMINE AN OPTIMAL FILTER/STAGE SEQUENCE BASED ON COSTS AND/OR DEFINED USER PRIORITIES OPERATION 409 is provided to the filter supervisor and the optimal filter/stage sequence is then implemented semi-automatically pending user and/or security system provider review/approval.

In one embodiment, at IMPLEMENT THE DETERMINED OPTIMAL FILTER/STAGE SEQUENCE OPERATION 411 the optimal filter/stage sequence of ANALYZE DATA REPRESENTING THE COST/USE PROFILES FOR EACH OF THE TWO OR MORE FILTERS/STAGES TO DETERMINE AN OPTIMAL FILTER/STAGE SEQUENCE BASED ON COSTS AND/OR DEFINED USER PRIORITIES OPERATION 409 is implemented using one or more processors associated with a user computing system, such as CPU(s) 201 of user computing system 100 of FIGS. 1 and 2.

Returning to FIG. 4, in one embodiment, at IMPLEMENT THE DETERMINED OPTIMAL FILTER/STAGE SEQUENCE OPERATION 411 the optimal filter/stage sequence of ANALYZE DATA REPRESENTING THE COST/USE PROFILES FOR EACH OF THE TWO OR MORE FILTERS/STAGES TO DETERMINE AN OPTIMAL FILTER/STAGE SEQUENCE BASED ON COSTS AND/OR DEFINED USER PRIORITIES OPERATION 409 is implemented using one or more processors associated with a security system provider computing system, such as CPU(s) 301 of security system provider computing system 150 of FIGS. 1 and 3.

Returning to FIG. 4, in one embodiment, at IMPLEMENT THE DETERMINED OPTIMAL FILTER/STAGE SEQUENCE OPERATION 411 the optimal filter/stage sequence of ANALYZE DATA REPRESENTING THE COST/USE PROFILES FOR EACH OF THE TWO OR MORE FILTERS/STAGES TO DETERMINE AN OPTIMAL FILTER/STAGE SEQUENCE BASED ON COSTS AND/OR DEFINED USER PRIORITIES OPERATION 409 is implemented using one or more processors associated with any computing system, as discussed herein, and/or as known in the art at the time of filing, and/or as developed after the time of filing.

In one embodiment, at IMPLEMENT THE DETERMINED OPTIMAL FILTER/STAGE SEQUENCE OPERATION 411 the optimal filter/stage sequence of ANALYZE DATA REPRESENTING THE COST/USE PROFILES FOR EACH OF THE TWO OR MORE FILTERS/STAGES TO DETERMINE AN OPTIMAL FILTER/STAGE SEQUENCE BASED ON COSTS AND/OR DEFINED USER PRIORITIES OPERATION 409 is implemented using an optimal sequence implementation module, such as optimal sequence implementation module 257 of user computing system 100 of FIGS. 1 and 2.

Returning to FIG. 4, in one embodiment, at IMPLEMENT THE DETERMINED OPTIMAL FILTER/STAGE SEQUENCE OPERATION 411 the optimal filter/stage sequence of ANALYZE DATA REPRESENTING THE COST/USE PROFILES FOR EACH OF THE TWO OR MORE FILTERS/STAGES TO DETERMINE AN OPTIMAL FILTER/STAGE SEQUENCE BASED ON COSTS AND/OR DEFINED USER PRIORITIES OPERATION 409 is implemented using an optimal sequence implementation module, such as optimal sequence implementation module 357 of security system provider computing system 150 of FIGS. 1 and 3.

Returning to FIG. 4, in one embodiment, the at least two of the two or more filters/stages of the multiple filter/stage security system of PROVIDE A MULTIPLE FILTER/STAGE SECURITY SYSTEM OPERATION 403 are periodically monitored at MONITOR TWO OR MORE FILTERS/STAGES OF THE MULTIPLE FILTER/STAGE SECURITY SYSTEM OPERATION 405 such as every minute, multiple minutes, hours, days, weeks, etc. In one embodiment, the at least two of the two or more filters/stages of the multiple filter/stage security system of PROVIDE A MULTIPLE FILTER/STAGE SECURITY SYSTEM OPERATION 403 are periodically monitored at MONITOR TWO OR MORE FILTERS/STAGES OF THE MULTIPLE FILTER/STAGE SECURITY SYSTEM OPERATION 405 continuously.

In one embodiment, the analysis to determine a cost/use profile for each filter/stage of ANALYZE DATA REPRESENTING THE RESULTS OF MONITORING OF THE TWO OR MORE FILTER/STAGES OF THE MULTIPLE FILTER/STAGE SECURITY SYSTEM TO CREATE A COST/USE PROFILE FOR EACH OF THE TWO OR MORE FILTERS/STAGES OPERATION 407 is repeated periodically, such as every minute, multiple minutes, hours, days, weeks, etc.

In one embodiment, the optimal filter/stage sequence of ANALYZE DATA REPRESENTING THE COST/USE PROFILES FOR EACH OF THE TWO OR MORE FILTERS/STAGES TO DETERMINE AN OPTIMAL FILTER/STAGE SEQUENCE BASED ON COSTS AND/OR DEFINED USER PRIORITIES OPERATION 409 is repeated/updated periodically, such as every minute, multiple minutes, hours, days, weeks, etc.

As a result, in one embodiment, a new/updated optimal filter/stage sequence is implemented/re-implemented periodically, such as every minute, multiple minutes, hours, days, weeks, etc at IMPLEMENT THE DETERMINED OPTIMAL FILTER/STAGE SEQUENCE OPERATION 411.

In one embodiment, once the optimal filter/stage sequence of ANALYZE DATA REPRESENTING THE COST/USE PROFILES FOR EACH OF THE TWO OR MORE FILTERS/STAGES TO DETERMINE AN OPTIMAL FILTER/STAGE SEQUENCE BASED ON COSTS AND/OR DEFINED USER PRIORITIES OPERATION 409 is implemented at IMPLEMENT THE DETERMINED OPTIMAL FILTER/STAGE SEQUENCE OPERATION 411, process flow proceeds to EXIT OPERATION 431 and, as noted, in one embodiment: the at least two of the two or more filters/stages of the multiple filter/stage security system of PROVIDE A MULTIPLE FILTER/STAGE SECURITY SYSTEM OPERATION 403 are periodically, and/or continuously, monitored at MONITOR TWO OR MORE FILTERS/STAGES OF THE MULTIPLE FILTER/STAGE SECURITY SYSTEM OPERATION 405; the analysis to determine a cost/use profile for each filter/stage of ANALYZE DATA REPRESENTING THE RESULTS OF MONITORING OF THE TWO OR MORE FILTER/STAGES OF THE MULTIPLE FILTER/STAGE SECURITY SYSTEM TO CREATE A COST/USE PROFILE FOR EACH OF THE TWO OR MORE FILTERS/STAGES OPERATION 407 is repeated/updated periodically; the optimal filter/stage sequence of ANALYZE DATA REPRESENTING THE COST/USE PROFILES FOR EACH OF THE TWO OR MORE FILTERS/STAGES TO DETERMINE AN OPTIMAL FILTER/STAGE SEQUENCE BASED ON COSTS AND/OR DEFINED USER PRIORITIES OPERATION 409 is repeated/updated periodically; and a new/updated optimal filter/stage sequence is implemented/re-implemented periodically at IMPLEMENT THE DETERMINED OPTIMAL FILTER/STAGE SEQUENCE OPERATION 411.

Using process for dynamically and automatically optimizing multiple filter/stage security systems 400, a multiple filter/stage security system is dynamically, and in one embodiment automatically, adjusted so the multiple filter/stage security system can effectively and efficiently respond to the highly dynamic nature, volume, and variety of undesirable content currently being propagated, without performing unnecessary and/or redundant analysis. Consequently, using process for dynamically and automatically optimizing multiple filter/stage security systems 400, significant amounts of resources can be saved, and/or be put to more effective use, while still providing at least the same level, or better, of protection. In addition, process for dynamically and automatically optimizing multiple filter/stage security systems 400, a multiple filter/stage security system is dynamically, and in one embodiment automatically, adjusted to meet the specific needs of a given user based on the individual user's actual usage/traffic data and/or defined priorities. Consequently, process for dynamically and automatically optimizing multiple filter/stage security systems 400, both providers of multiple filter/stage security systems and user are benefited.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Herein, embodiments have been discussed with reference to the accompanying FIG.s, which depict one or more exemplary embodiments. The above description includes reference to specific embodiments for illustrative purposes. However, the illustrative discussion above is not intended to be exhaustive or to limit the invention to the precise forms disclosed. Many modifications and variations are possible in view of the teachings below. The embodiments discussed above were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIG.s, and/or described below. In addition, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "providing", "receiving", "analyzing", "extracting", "generating", "sending", "capturing", "monitoring", "obtaining", "requesting", "storing", "saving", "implementing", "comparing", "calculating", "processing", "using", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicably coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s for method and apparatus and/or process or application for providing scroll bar enabled bookmarks in electronic document displays, discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for dynamically and automatically optimizing multiple filter/stage security systems comprising:

providing a multiple filter/stage security system, the multiple filter/stage security system including two or more filters/stages with each filter/stage being implemented to detect, block, or filter out, undesirable content based on parameters/tests specific to that filter/stage in a defined initial filter/stage order;

monitoring the operation and filtering activity of at least two of the two or more filters/stages of the multiple filter/stage security system to determine the cost or effectiveness of the at least two of the two or more filters/stages of the multiple filter/stage security system using one or more processors associated with one or more computing systems;

analyzing data representing the results of the monitoring of the operation and filtering activity of the at least two of the two or more filters/stages of the multiple filter/stage security system to determine a cost/use profile for each filter/stage of the at least two of the two or more filters/stages of the multiple filter/stage security system using one or more processors associated with one or more computing systems;

analyzing the cost/use profiles for each filter/stage of the at least two of the two or more filters/stages of the multiple filter/stage security system to determine an optimal order of application of the at least two of the two or more filters/stages of the multiple filter/stage security system using one or more processors associated with one or more computing systems, the optimal order being determined to be an order which results in one or more of lower input/out latency, lower server cost, and a lower database access time; and transforming the initial filter/stage order to the determined optimal order of application of the at least two of the two or more filters/stages of the multiple filter/stage security system using one or more processors associated with one or more computing systems.

2. The computing system implemented process for dynamically and automatically optimizing multiple filter/stage security systems of claim 1, wherein:

the multiple filter/stage security system is implemented, at least in part, on a user computing system.

3. The computing system implemented process for dynamically and automatically optimizing multiple filter/stage security systems of claim 1, wherein:

the multiple filter/stage security system is implemented, at least in part, on a security system provider computing system.

4. The computing system implemented process for dynamically and automatically optimizing multiple filter/stage security systems of claim 1, wherein:

monitoring the operation and filtering activity of at least two of the two or more filters/stages of the multiple filter/stage security system includes monitoring at least one cost/use parameter selected from the group of cost/use parameters consisting of:

the cost of capital equipment necessary to implement the given filter/stage;

the hosting costs associated with the given filter/stage;

the processing costs associated with the given filter/stage;

database access and lookups and access time associated with implementing the given filter/stage;

Input/Output (I/O) latencies associated with implementing the given filter/stage;

the actual number or proportion of e-mails, IMs, and/or files blocked by the given filter/stage;

the number or proportion of e-mails, IMs, and/or files blocked by the given filter/stage that actually included, or were, undesirable content;

the number or proportion of e-mails, IMs, and/or files blocked by the given filter/stage that did not include undesirable content.

5. The computing system implemented process for dynamically and automatically optimizing multiple filter/stage security systems of claim 4, wherein:

the cost/use parameters are prioritized by a user of the computing system implemented process for dynamically and automatically optimizing multiple filter/stage security systems;

the cost/use profile for each filter/stage of the at least two of the two or more filters/stages of the multiple filter/stage security system is determined based, at least in part, on the user prioritized cost/use parameters; and the optimal order of application of the at least two of the two or more filters/stages of the multiple filter/stage security system is determined, based at least in part, on the user prioritized cost/use parameters.

6. The computing system implemented process for dynamically and automatically optimizing multiple filter/stage security systems of claim 1, wherein:

the cost/use parameters are prioritized by a security system provider providing the computing system implemented process for dynamically and automatically optimizing multiple filter/stage security systems;

the cost/use profile for each filter/stage of the at least two of the two or more filters/stages of the multiple filter/stage security system is determined based, at least in part, on the security system provider prioritized cost/use parameters; and the optimal order of application of the at least two of the two or more filters/stages of the multiple filter/stage security system is determined, based at least in part, on the security system provider prioritized cost/use parameters.

7. The computing system implemented process for dynamically and automatically optimizing multiple filter/stage security systems of claim 1, wherein:

the initial filter/stage order is transformed to the determined optimal order of application of the at least two of the two or more filters/stages of the multiple filter/stage security system automatically.

8. The computing system implemented process for dynamically and automatically optimizing multiple filter/stage security systems of claim 1, wherein:

the initial filter/stage order is transformed to the determined optimal order of application of the at least two of the two or more filters/stages of the multiple filter/stage security system semi-automatically.

9. The computing system implemented process for dynamically and automatically optimizing multiple filter/stage security systems of claim 1, further comprising:

monitoring the operation and filtering activity of the at least two of the two or more filters/stages of the multiple filter/stage security system to determine the cost or effectiveness of the at least two of the two or more filters/stages of the multiple filter/stage security system using one or more processors associated with one or more computing systems on a periodic basis;

re-analyzing data representing the results of the monitoring of the operation and filtering activity of the at least two of the two or more filters/stages of the multiple filter/stage security system to determine a cost/use the multiple filter/stage security system using one or more processors associated with one or more computing systems on a periodic basis;

re-analyzing the cost/use profiles for each filter/stage of the at least two of the two or more filters/stages of the multiple filter/stage security system to determine an optimal order of application of the at least two of the two or more filters/stages of the multiple filter/stage security system using one or more processors associated with one or more computing systems on a periodic basis; and transforming the initial filter/stage order to the determined optimal order of application of the at least two of the two or more filters/stages of the multiple filter/stage security system using one or more processors associated with one or more computing systems on a periodic basis.

10. A system for dynamically and automatically optimizing multiple filter/stage security systems comprising:

at least one computing system;

a multiple filter/stage security system, the multiple filter/stage security system being implemented, at least in part, on the at least one computing system, the multiple filter/stage security system including two or more filters/stages with each filter/stage being implemented to detect, block, or filter out, undesirable content based on parameters/tests specific to that filter/stage in a defined initial filter/stage order;

at least one processor associated with the at least one computing system, the at least one processor associated with the at least one computing system executing at least part of a computing system implemented process for dynamically and automatically optimizing multiple filter/stage security systems, the computing system implemented process for dynamically and automatically optimizing multiple filter/stage security systems comprising:

monitoring the operation and filtering activity of at least two of the two or more filters/stages of the multiple filter/stage security system to determine the multiple filter/stage security system using the at least one processor associated with the at least one computing system;

analyzing data representing the results of the monitoring of the operation and filtering activity of the at least two of the two or more filters/stages of the multiple filter/stage security system to determine a cost/use profile for each filter/stage of the at least two of the two or more filters/stages of the multiple filter/stage security system using the at least one processor associated with the at least one computing system;

analyzing the cost/use profiles for each filter/stage of the at least two of the two or more filters/stages of the multiple filter/stage security system to determine an optimal order of application of the at least two of the two or more filters/stages of the multiple filter/stage security system using the at least one processor associated with the at least one computing system, the optimal order being determined to be an order which results in one or more of lower input/out latency, lower server cost, and a lower database access time; and transforming the initial filter/stage order to the determined optimal order of application of the at least two of the two or more filters/stages of the multiple filter/stage security system using the at least one processor associated with the at least one computing system.

11. The system for dynamically and automatically optimizing multiple filter/stage security systems of claim 10, wherein:

the multiple filter/stage security system is implemented, at least in part, on a user computing system.

12. The system for dynamically and automatically optimizing multiple filter/stage security systems of claim 10, wherein:

the multiple filter/stage security system is implemented, at least in part, on a security system provider computing system.

13. The system for dynamically and automatically optimizing multiple filter/stage security systems of claim 10, wherein:

monitoring the operation and filtering activity of at least two of the two or more filters/stages of the multiple filter/stage security system includes monitoring at least one cost/use parameter selected from the group of cost/use parameters consisting of:

the cost of capital equipment necessary to implement the given filter/stage;

the hosting costs associated with the given filter/stage;

the processing costs associated with the given filter/stage;

database access and lookups and access time associated with implementing the given filter/stage;

disk access time associated with implementing the given filter/stage;

Input/Output (I/O) latencies associated with implementing the given filter/stage;

the actual number or proportion of e-mails, IMs, and/or files blocked by the given filter/stage;

the number or proportion of e-mails, IMs, and/or files blocked by the given filter/stage that actually included, or were, undesirable content;

the number or proportion of e-mails, IMs, and/or files blocked by the given filter/stage that did not include undesirable content.

14. The system for dynamically and automatically optimizing multiple filter/stage security systems of claim 13, wherein:

the cost/use parameters are prioritized by a user of the computing system implemented process for dynamically and automatically optimizing multiple filter/stage security systems;

the cost/use profile for each filter/stage of the at least two of the two or more filters/stages of the multiple filter/stage security system is determined based, at least in the optimal order of application of the at least two of the two or more filters/stages of the multiple filter/stage security system is determined, based at least in part, on the user prioritized cost/use parameters.

15. The system for dynamically and automatically optimizing multiple filter/stage security systems of claim 10, wherein:

the cost/use parameters are prioritized by a security system provider providing the computing system implemented process for dynamically and automatically optimizing multiple filter/stage security systems;

the cost/use profile for each filter/stage of the at least two of the two or more filters/stages of the multiple filter/stage security system is determined based, at least in part, on the security system provider prioritized cost/use parameters; and the optimal order of application of the at least two of the two or more filters/stages of the multiple filter/stage security system is determined, based at least in part, on the security system provider prioritized cost/use parameters.

16. The system for dynamically and automatically optimizing multiple filter/stage security systems of claim 10, wherein:

the initial filter/stage order is transformed to the determined optimal order of application of the at least two of the two or more filters/stages of the multiple filter/stage security system automatically.

17. The system for dynamically and automatically optimizing multiple filter/stage security systems of claim 10, wherein:

the initial filter/stage order is transformed to the determined optimal order of application of the at least two of the two or more filters/stages of the multiple filter/stage security system semi-automatically.

18. The system for dynamically and automatically optimizing multiple filter/stage security systems of claim 10, further comprising:

monitoring the operation and filtering activity of the at least two of the two or more filters/stages of the multiple filter/stage security system to determine the cost or effectiveness of the at least two of the two or more filters/stages of the multiple filter/stage security system using the at least one processor associated with the at least one computing system on a periodic basis;

re-analyzing data representing the results of the monitoring of the operation and filtering activity of the at least two of the two or more filters/stages of the multiple filter/stage security system to determine a cost/use profile for each filter/stage the at least two of the two or more filters/stages of the multiple filter/stage security system using the at least one processor associated with the at least one computing system on a periodic basis;

re-analyzing the cost/use profiles for each filter/stage of the at least two of the two or more filters/stages of the multiple filter/stage security system to determine an optimal order of application of the at least two of the two or more filters/stages of the multiple filter/stage security system using the at least one processor associated with the at least one computing system on a periodic basis; and transforming the initial filter/stage order to the determined optimal order of application of the at least two of the two or more filters/stages of the multiple filter/stage security system using the at least one processor associated with the at least one computing system on a periodic basis.

19. A method for dynamically and automatically optimizing multiple filter/stage security systems comprising:

providing a multiple filter/stage security system, the multiple filter/stage implemented to detect, block, or filter out, undesirable content based on parameters/tests specific to that filter/stage in a defined initial filter/stage order;

monitoring the operation and filtering activity of at least two of the two or more filters/stages of the multiple filter/stage security system to determine the cost or effectiveness of the at least two of the two or more filters/stages of the multiple filter/stage security system using one or more processors associated with one or more computing systems;

analyzing data representing the results of the monitoring of the operation and filtering activity of the at least two of the two or more filters/stages of the multiple filter/stage security system to determine a cost/use profile for each filter/stage of the at least two of the two or more filters/stages of the multiple filter/stage security system using one or more processors associated with one or more computing systems;

analyzing the cost/use profiles for each filter/stage of the at least two of the two or more filters/stages of the multiple filter/stage security system to determine an optimal order of application of the at least two of the two or more filters/stages of the multiple filter/stage security system using one or more processors associated with one or more computing systems, the optimal order being determined to be an order which results in one or more of lower input/out latency, lower server cost, and a lower database access time; and transforming the initial filter/stage order to the determined optimal order of application of the at least two of the two or more filters/stages of the multiple filter/stage security system using one or more processors associated with one or more computing systems.

20. The method for dynamically and automatically optimizing multiple filter/stage security systems of claim 19, wherein:

monitoring the operation and filtering activity of at least two of the two monitoring at least one cost/use parameter selected from the group of cost/use parameters consisting of:

the cost of capital equipment necessary to implement the given filter/stage;

the hosting costs associated with the given filter/stage;

the processing costs associated with the given filter/stage;

database access and lookups and access time associated with implementing the given filter/stage;

disk access time associated with implementing the given filter/stage;

Input/Output (I/O) latencies associated with implementing the given filter/stage;

the actual number or proportion of e-mails, IMs, and/or files blocked by the given filter/stage;

the number or proportion of e-mails, IMs, and/or files blocked by the given filter/stage that actually included, or were, undesirable content;

the number or proportion of e-mails, IMs, and/or files blocked by the given filter/stage that did not include undesirable content.

* * * * *

UNITED STATES PATENT AND TRADEMARK OFFICE
CERTIFICATE OF CORRECTION

PATENT NO. : 8,407,789 B1
APPLICATION NO. : 12/618948
DATED : March 26, 2013
INVENTOR(S) : John Mears It is certified that error appears in the above-identified patent and that said Letters Patent is hereby corrected as shown below:

In the Claims

Column 24, Line 52, Claim 4, after the line: "with implementing the given filter/stage;" insert --disk access time associated with implementing the given filter/stage;--;

Column 25, Line 57, Claim 9, after "to determine a cost/use", insert --profile for each filter/stage the at least two of the two or more filters/stages of--;

Column 26, Line 28, Claim 10, after "to determine", insert --the cost or effectiveness of the at least two of the two or more filters/stages of--;

Column 27, Line 33, Claim 14, after "based, at least in", insert --part, on the user prioritized cost/use parameters; and--;

Column 28, Line 37, Claim 19, between "filter/stage" and "implemented", insert --security system including two or more filters/stages with each filter/stage being--; and Column 29, Line 8, Claim 20, after "two of the two", insert --or more filters/stages of the multiple filter/stage security system includes--.

Signed and Sealed this
Twenty-second Day of October, 2013

Teresa Stanek Rea
*Deputy Director of the United States Patent and Trademark Office*